Patented Jan. 23, 1951

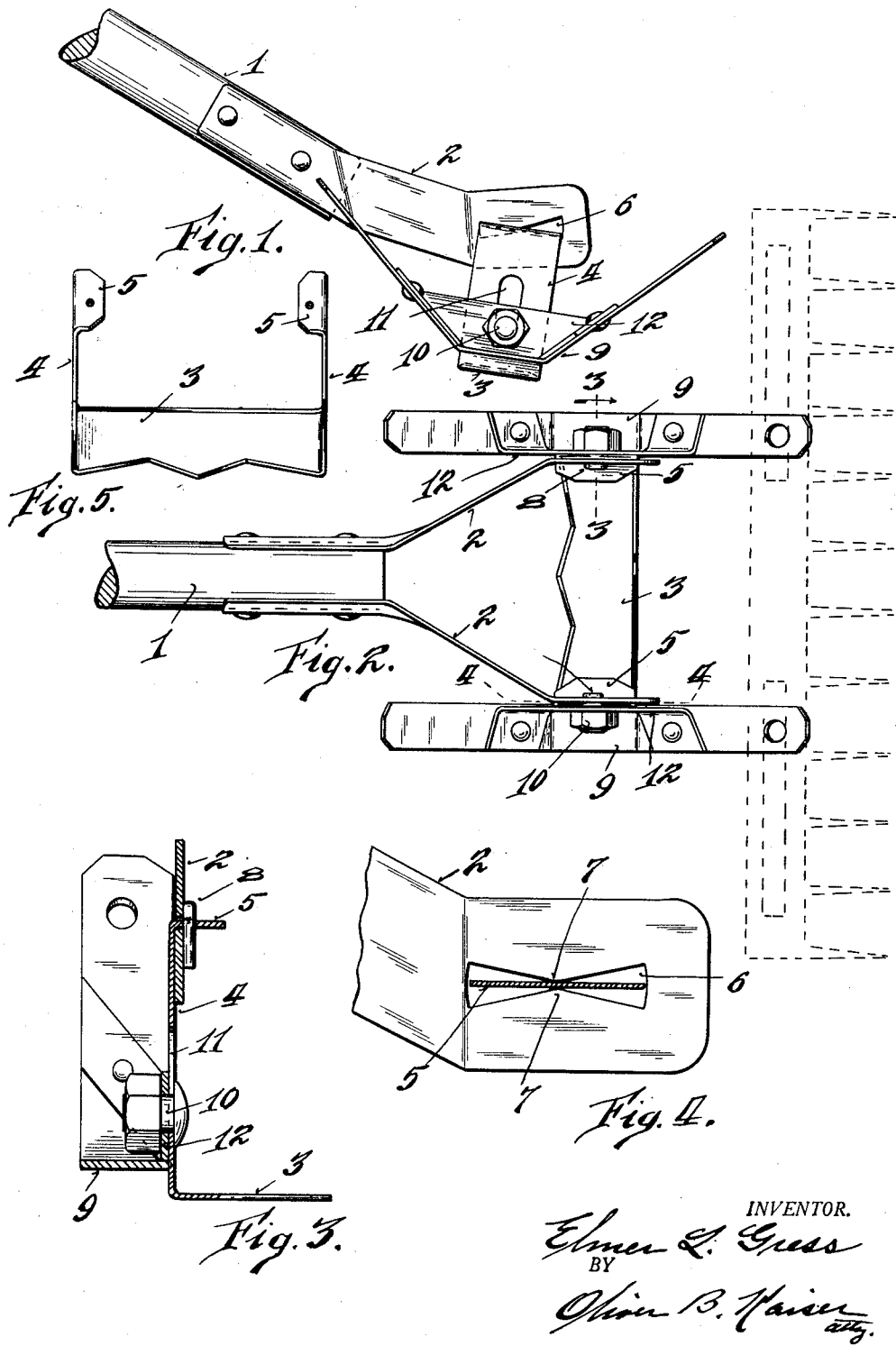

2,539,351

UNITED STATES PATENT OFFICE 2,539,351

GARDEN CULTIVATING TOOL

Elmer L. Gress, Cincinnati, Ohio

Application January 9, 1947, Serial No. 721,127

2 Claims. (Cl. 97—68)

This invention relates to a hand tool for garden cultivation, weeding and other uses having a double knife edge blade extending transversely from the end of a handle for penetrating into the soil in either or alternate drawing or pushing stroke motions of the handle.

An object of the invention is to provide a garden tool having a blade or bit extending from an end of a handle in a plane transverse thereto with its opposite longitudinal edges sharpened, one of a straight and the other as a configurated design, the blade pivotally mounted to appropriately pitch the same for skiving or penetration into the soil in either of alternate forward and backward stroke motions, with the depth of soil penetration governed by runners disposed at the opposite ends of the blade.

Another object is to provide a garden tool for cultivating and weed cutting mounted transversely upon an end of a handle rod for soil penetration under either a drawing or pushing stroke motion and the depth of soil penetration governed by a pair of parallel runners respectively at the opposite ends of the blade, linear with the stroke movements of the tool and adapted to provide supports for the application thereon of various types of attachments, as a rake head, hoe or scraper blade.

Another object is to provide a garden cultivating and weed cutting tool consisting of a knife edged blade mounted transversely within a pronged end of a handle and offset therefrom and disposed at an angle for soil penetration in either a drawing or pushing stroke of the handle.

Various other features and advantages of the invention will be more fully set forth in the following description of the drawings accompanied herewith, forming a part hereof and depicting a preferred embodiment, in which:

Figure 1 is a side elevation of the improved garden cultivating tool.

Figure 2 is a top plan view thereof.

Figure 3 is an enlarged section taken on line 3—3, Figure 2.

Figure 4 is an enlarged section taken on line 4—4, Figure 2.

Figure 5 is a perspective view of the cultivating blade or bit.

Referring to the drawings, 1 indicates a handle bar of suitable length for a person to use the tool in a standing position having a pair of sheet metal limbs or shanks 2 fixed to an end thereof and extending therefrom from relative opposite sides, to provide a fork extension or bifurcating an end of the handle bar as a support for a blade 3 mounted intermediate thereof.

The shanks 2, 2, extend forwardly from the handle bar 1, with an intermediate portion thereof from the end of the handle bar extending at a slight angle longitudinally therefrom and relatively divergingly laterally outward from opposite sides of the handle bar, with the forward end portion of the shanks extending in parallelism and perpendicular planes and at a slight angle longitudinally from the intermediate portion so that the reach or forward ends of the shanks are horizontally disposed in an operative position of the tool. The shanks therefore provide a fork or yoke shaped frame for intermediately sustaining the blade and depending laterally therefrom to offset the plane of the body portion of the blade from the handle.

The blade 3 is formed from a flat sheet metal gauge steel strip, having opposite uniform length end portions thereof bent at right angles or perpendicular to the intermediate body portion providing hanger arms or stems 4, 4, in parallelism. The terminals of the stems 4, 4 each are bent at right angles to provide inwardly extending flanges 5—5, each for traversing a slot 6, respectively in the forward end portion of the shanks or frame elements 2, 2 fixed to the handle bar 1.

The slots 6, as shown in Figure 1, each is of an outline to approximately form a pair of congruent triangles with the midpoint central of the length of the slot and the slot extending longitudinal of the end portion of the shank. The midpoint of the slot provides opposing fulcrum points 7, 7, at relative opposite face sides of the lateral flange 5 of the blade hanger arms or stems traversing the slot. This provides for a rocking or swinging movement of the blade to pitch or cant the plane of its body or work portion at an angle to penetrate into the soil under a stroke moving force and appropriately to the direction of motion to convey the loosened soil thereover.

The swinging movement of the blade is limited by the cross-wise dimension of the slot and the pitch governed by the degree of angle of the longitudinal sides thereof, the blade contacting with the correspondingly angled opposite edges formed by the outline configuration of the slot. The blade is thus alternately pitched in the forward and reverse strokes of the tool and by short hammer strokes of the tool solid and compact soil can be readily and easily loosened without undue force, thus non-fatiguing to the operator.

The blade is sustained against displacement from its connection with the frame formed by the shanks, by cotter pins 8, respectively engaged through an aperture in the flanges 5, 5 of the hanger arms of the blade.

The opposite edges of the hanger arms of the blade for a definite length from the body portion are also sharpened as in continuation to the relative knife edges of the body of the blade for a sidewise cutting of the soil which also eases the cutting stroke.

The cutter blade carries a pair of runners 9, 9, one at each of the opposite ends thereof, each adjustably mounted upon the outer face side of a hanger arm and fixed thereto by a bolt 10 traversing an elongated slot 11 in the hanger arms of the blade. The adjustment provides for setting the runners to regulate and control the soil penetrating depth of the blade.

The runners are of duplicate construction and interchangeably applicable upon either end of the blade, each comprising a metal strip having its opposite end portions divergingly inclined and connected by a brace 12 which serves for centrally mounting the runner to a perpendicular hanger arm of the blade. The intermediate body portion of the runner which slides upon the soil and is coplanar with the blade has its inner edge notched for recessing the hanger arm of the blade to which it is applied, to lock the same thereto. It is obvious that other methods may be employed for rigidly binding the blade and runners together, as a carriage type or bolt squared beneath its head and interfittingly engaged through a rectangular aperture in the brace of the runner.

With the forward end of the runners appropriately angled they serve as supports for securing various types of attachments thereon, as a rake head, illustrated in dotted lines in Figure 2, serviceable in reversing the tool, bringing the cultivator blade 3 overhead and the rake perpendicular from the handle.

The tool is extremely light in weight and being formed from sheet and bar metal material offers low cost of production and durability. As the runners limit the blade to a determined depth of soil penetration sufficient for ample cultivation and shearing of the weeds and which for the maximum depth is comparatively shallow it can be maneuvered in short quick strokes with a minimum effort non-burdensome to the user.

It is obvious that the blade can be reversed to bring the toothed edge forward, also various methods may be employed for hingedly mounting the blade upon the handle, or reversed from that shown in aperturing each limb of the blade and having a flange or lip extending from the handle engaged respectively therethrough.

Having described my invention, I claim:

1. A garden cultivating hand tool, comprising a handle bar having a pair of shanks fixed to and projecting from an end thereof, to bifurcate the end of the bar, the forward end portion of each shank having an elongated slot therethrough longitudinally thereof, with the opposite longitudinal sides of each slot opposingly angled to provide opposing fulcrum points centrally of the slot length for swingingly anchoring an end of a blade engaged therein and a flat blade having its opposite longitudinal ends bent perpendicularly thereto to provide a pair of stems, each with its terminal bent to extend laterally from the stem for sidewise engagement into a relative slot in the bifurcated end of the handle bar for anchoring the blade to and between the bifurcated end of the handle bar for swingingly canting the same in alternate directions and in a canted position in bearing contact with correspondingly inclined opposing edges of the slot to sustain the same for its full width.

2. A garden cultivating hand tool, comprising a handle bar having a pair of shanks fixed to and projecting from an end thereof to bifurcate the end of the bar, the forward end portion of each shank having an elongated slot therethrough, longitudinally thereof, with the opposite sides of each slot opposingly angled to provide opposing fulcrum points centrally of the slot length to swingingly anchor an end of a blade engaged therein, and a flat blade having its opposite longitudinal ends bent perpendicularly to provide a pair of stems, each having its terminal bent to extend laterally therefrom for sidewise engagement into a relative slot in the bifurcated end of the handle bar to anchor the blade to and between the bifurcated end of the handle bar and for swingingly canting the same in alternate directions, the laterally bent terminals of the stems of the blade extending toward each other to adapt the stems in their anchoring connection with the bifurcated end of the bar to overlie the outer side thereof to confine the same against outward flex.

ELMER L. GRESS.

REFERENCES CITED

The following references are of record in the file of this patent:

UNITED STATES PATENTS

| Number | Name | Date |
| --- | --- | --- |
| 390,679 | Jacobus | Oct. 9, 1888 |
| 841,708 | McClure | Jan. 22, 1907 |
| 1,212,563 | Rowe | Jan. 16, 1917 |
| 2,127,751 | Picha | Aug. 23, 1938 |
| 2,248,421 | Bouton | July 8, 1941 |